Figure 3:
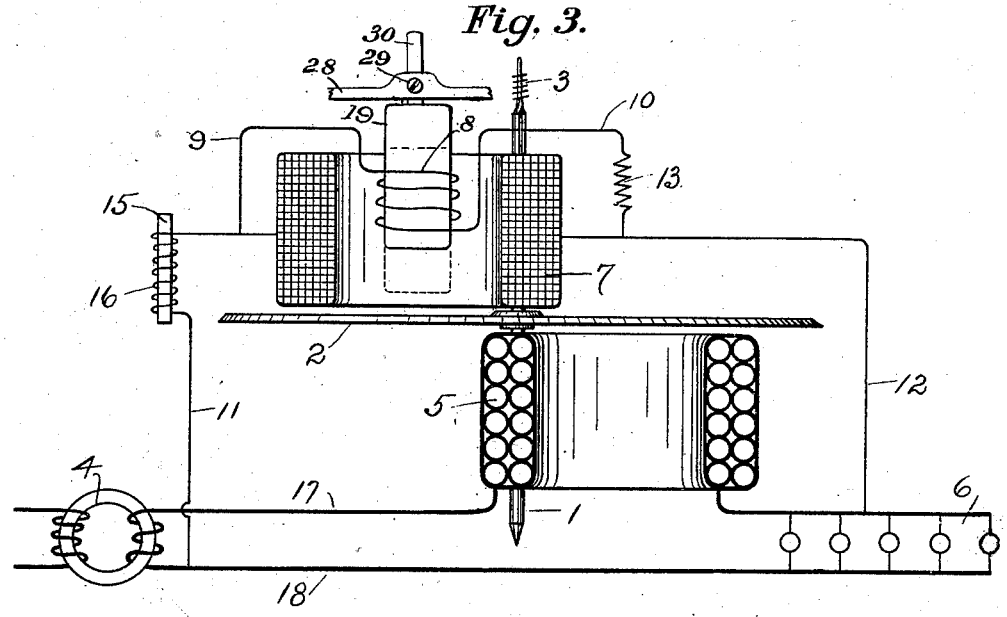

No. 698,638. Patented Apr. 29, 1902.
T. DUNCAN.
ELECTRIC METER.
(Application filed Apr. 11, 1898.)
(No Model.) 4 Sheets—Sheet 1.
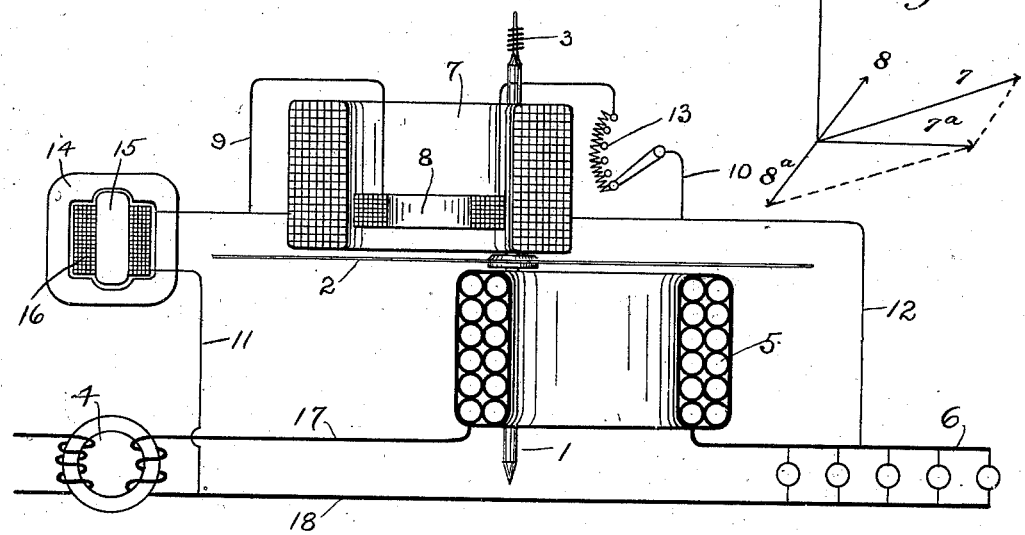
Fig. 1.
Fig. 9.
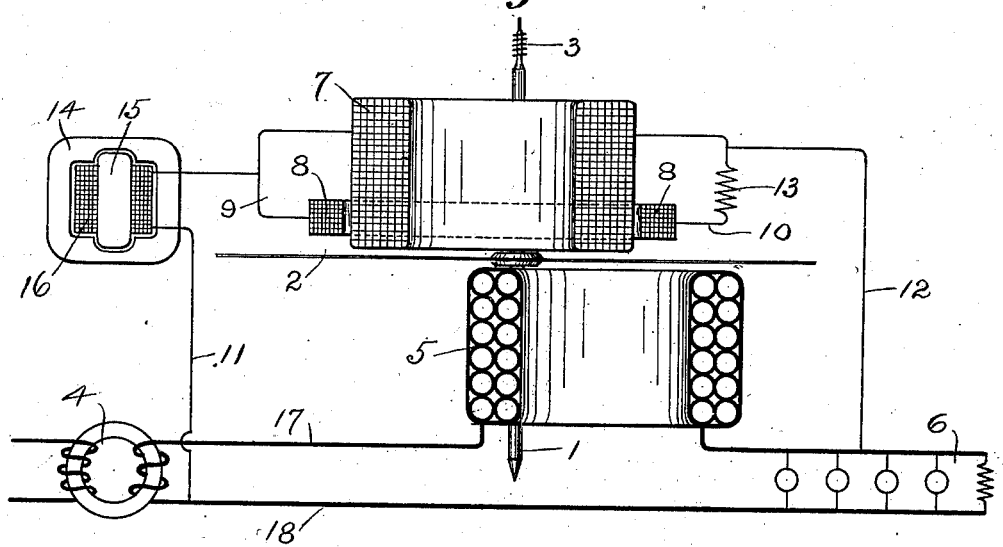
Fig. 2.
Witnesses
John E. Dalton
Adelaide Kearne
Thomas Duncan Inventor
By His Attorneys Chapin & Denny No. 698,638. Patented Apr. 29, 1902.
T. DUNCAN.
ELECTRIC METER.
(Application filed Apr. 11, 1898.)
(No Model.) 4 Sheets—Sheet 2.

Witnesses
John E. Dalton
Adelaide Keane

Thomas Duncan Inventor
By His Attorneys Chapin & Denny

THE NORRIS PETERS CO., PHOTO-LITHO., WASHINGTON, D. C.

No. 698,638.　　　　　　　　　　　　　　　　　　Patented Apr. 29, 1902.
T. DUNCAN.
ELECTRIC METER.
(Application filed Apr. 11, 1898.)
(No Model.)　　　　　　　　　　　　　　　　　　4 Sheets—Sheet 4.

Witnesses
John E. Dalton
Adelaide Keame

Thomas Duncan Inventor
By His Attorneys Chapin & Denny

UNITED STATES PATENT OFFICE.

THOMAS DUNCAN, OF FORT WAYNE, INDIANA, ASSIGNOR TO THE SIEMENS & HALSKE ELECTRIC COMPANY OF AMERICA, OF CHICAGO, ILLINOIS, A CORPORATION OF ILLINOIS.

ELECTRIC METER.

SPECIFICATION forming part of Letters Patent No. 698,638, dated April 29, 1902.

Application filed April 11, 1898. Serial No. 677,110. (No model.)

*To all whom it may concern:*

Be it known that I, THOMAS DUNCAN, a citizen of the United States, residing at Fort Wayne, in the county of Allen, in the State of Indiana, have invented certain new and useful Improvements in Electric Meters; and I do hereby declare that the following is a full, clear, and exact description of the invention, which will enable others skilled in the art to which it appertains to make and use the same, reference being had to the accompanying drawings, which form part of this specification.

My present invention relates to integrating motor-meters of the induction type or class adapted for use in alternating-current work.

It is well known that the accurate measurement of the energy in alternating-current systems possessing inductance requires that the magnetic field representing the electromotive force of the system of supply be in quadrature with the said electromotive force.

Various methods of securing a magnetic field in quadrature with the line electromotive force have been devised, some of which are unstable and unreliable in operation because of their susceptibility to changes in periodicity, pressure, and temperature.

The object, therefore, of my present invention is to provide a reliable and efficient means for measuring inductive loads by securing in the energizing-coil which represents the line-pressure a magnetic field in quadrature with such pressure.

In my divisional application, Serial No. 49,394, filed March 1, 1901, I have claimed my improved method.

My present improvement comprises in its preferred embodiment a series field coil or coils connected in the main leads supplying the translating devices, a closed revoluble metallic armature in inductive relation to said series field, a volt or pressure coil connected in multiple to the supply-mains and including a suitable impedance-coil in series with it, an auxiliary coil in parallel with and in mutual coöperation with the said volt-coil, and a suitable measuring mechanism adapted to indicate or record the revolutions of said armature. Other embodiments of my invention may be devised, however, without departing from its spirit.

I am aware that magnetic quadrature in the volt or pressure coil has heretofore been obtained by the use of an auxiliary coil or winding operating in conjunction with the volt-coil; but this auxiliary coil either receives its currents from the main line by being connected in multiple therewith or by its being a closed-circuited secondary of itself and adapted to receive currents by induction when subjected to the inductive influence of the volt or pressure coil as its primary. I find that in both of these methods the energy consumed in maintaining such quadrature is much less efficient than in my present method about to be described.

Figure 4:
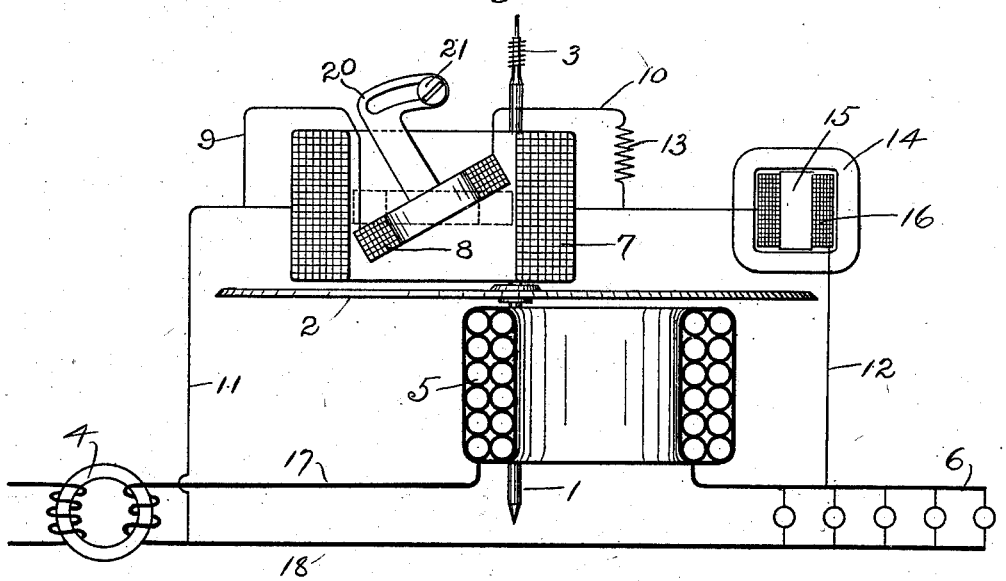
Figure 5:
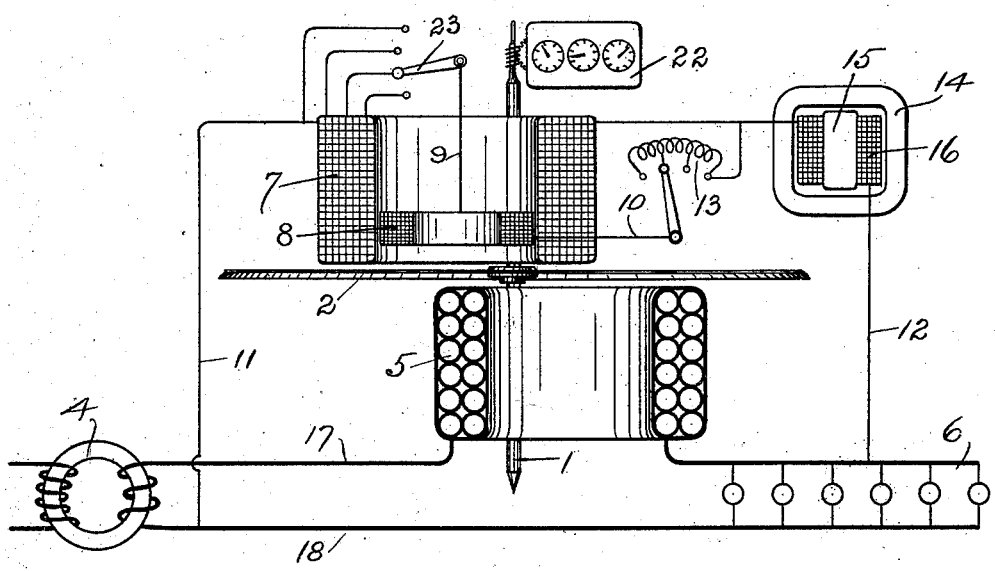
Figure 6:
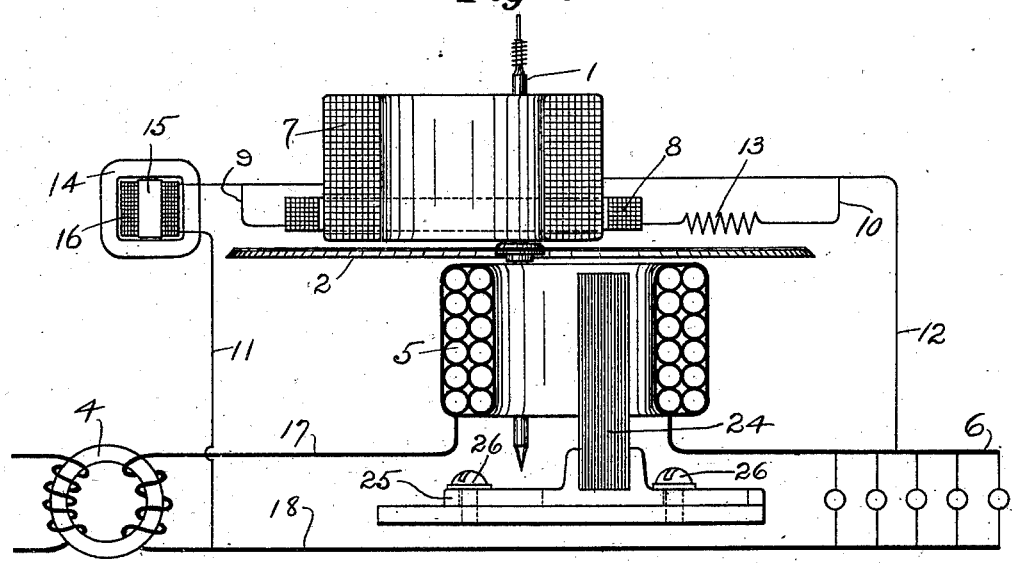
Figure 7:
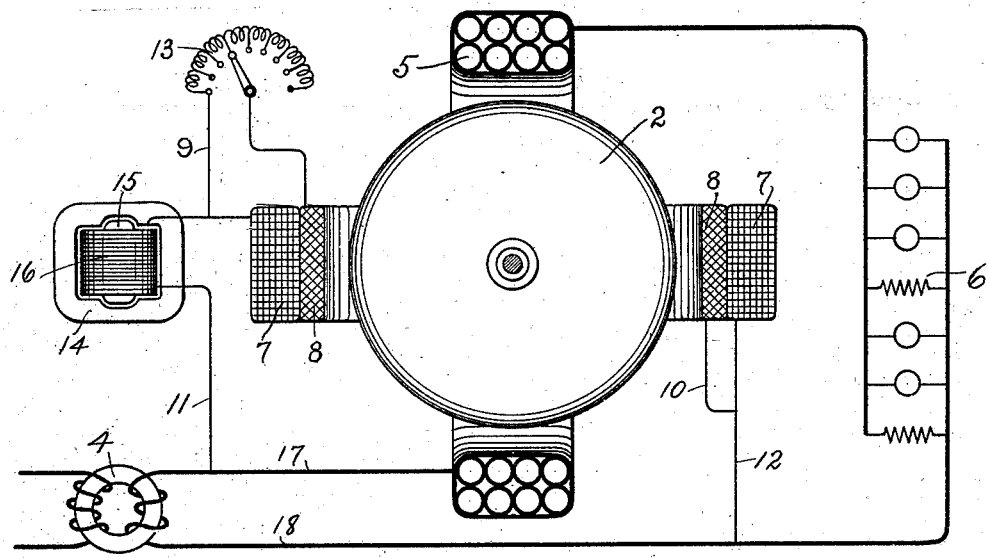
Figure 8:
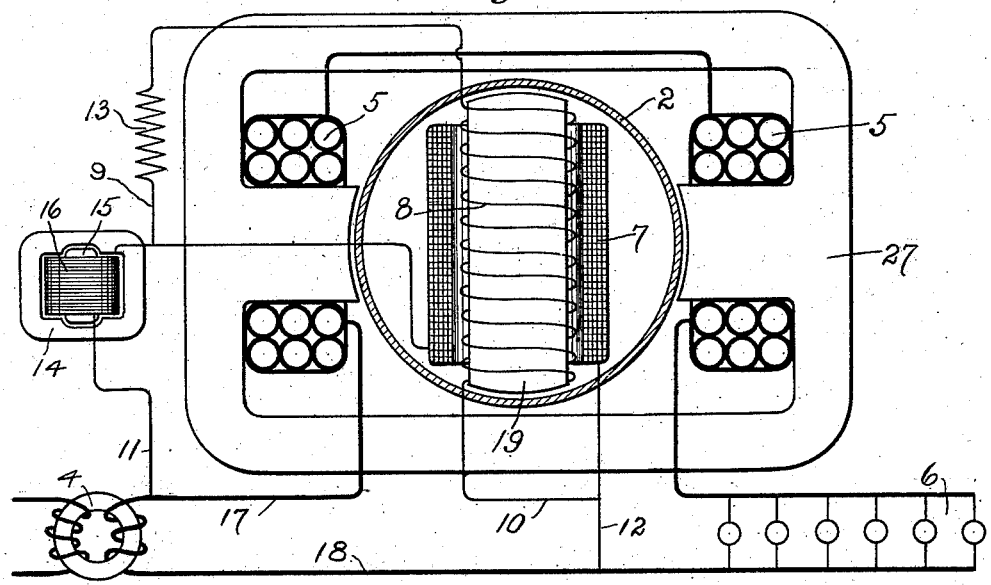

In the accompanying drawings, in which similar reference-numerals indicate like parts, Figure 1 is a side view of my improvement with the energizing-coils taken in vertical central section, showing their relative arrangement. Fig. 2 is a similar view to Fig. 1, with the auxiliary coil arranged outside of the volt-coil instead of the inside thereof. Fig. 3 is a like view and shows the auxiliary coil wound upon an iron core and adapted for a vertical adjustment within the volt-coil. Fig. 4 is also a vertical section of the energizing-coils, showing a modified construction whereby the auxiliary coil can be so adjusted that its magnetic axis will be at any desired angle to the axis of the inclosing volt-coil. Fig. 5 is a vertical central section showing a contact-switch adapted to connect the said auxiliary coil to different portions of the volt-coil. Fig. 6 is also in vertical section, showing an adjustable iron core within the series field-coil. Fig. 7 shows a cylindrical form of armature embraced by the energizing-coils, shown in horizontal section. Fig. 8 shows the field-coils mounted upon an iron punching and a concentric arrangement of the volt-coil and the auxiliary coil upon an iron core and within the cylindrical armature, the armature and energizing-coils being shown in transverse section. Fig. 9 is a diagrammatic view showing the relative values and the phase relation of the magnetizing forces of the coils 7 and 8.

The upright revoluble armature spindle or shaft 1 is properly supported in suitable bearings in the usual or other proper manner and carries upon its upper end a worm 3, adapted for a meshing engagement with a proper registering mechanism 22. At a suitable point on said spindle is rigidly fixed either a disk metallic armature, as shown in Figs. 1 to 6, inclusive, or a cylindrical form of armature, as shown in Figs. 7 and 8, the said armature being preferably of aluminium.

Referring now to those views showing a disk form of armature: In close proximity to the lower face of said armature is arranged the series field or ampere coil 5, connected with the generator 4, which supplies the translating devices in the work-circuit 6 through the main leads 17 and 18. The current flowing through this field-coil sets up a magnetic field proportional to said current. Upon the opposite side of said armature is arranged a volt or pressure coil 7, whose magnetic axis is parallel with, but not concentric with the magnetic axis of the said series field-coil 5. The said volt-coil 7 receives its current from the mains 17 and 18 by being connected therewith in multiple with the wires 11 and 12. An auxiliary phase-changing coil 8 is used in mutual and coaxial relation with the said volt-coil 7 and receives its current by conduction from the wires 9 and 10, which are connected in multiple to the terminals of the said volt-coil 7. This auxiliary coil may be arranged in coaxial relation with the said volt-coil either within or without the same, as shown, or it may be made adjustable within the volt-coil by means of a lever-arm 20, having upon its free outer end a slotted head and adapted for a lateral adjustment upon the fixed set-screw 21 whereby the magnetic axis of the said auxiliary coil can be readily and conveniently adjusted to any desired angle with the axis of the volt-coil. By this construction a slight starting torque can be imparted to the said armature for the purpose of overcoming the friction and inertia incident to starting on small loads. The auxiliary coil 8 may be provided with an iron core 19, Figs. 3 and 8, and it may be arranged coaxially with said volt-coil and within the cylindrical armature, as shown in Fig. 8. Any suitable means for adjusting the iron core 19, Fig. 3, may be employed, such as that shown by a support 28, rod 30, and set-screw 29. An impedance-coil 16 is wound upon a straight core 15 and properly secured inside of the surrounding envelop 14. This construction is easily made and readily assembled and gives the best impeding effect. The envelop 14 may be provided upon two of its opposite inner edges with vertical recesses to receive the corresponding polar ends of the core 15, which is then somewhat longer than the width of the coil 16. The core 15 and the envelop 14 are made from iron punchings and are held together in any suitable manner. The impedance-coil 16 is connected in series with the said volt-coil and receives its currents from the mains 17 and 18 by being connected therewith in multiple with the wires 11 and 12, and the coil 8 receives its currents by conduction from the wires 9 and 10, which are connected in multiple to the terminals of the said volt-coil. A resistance 13 is shown arranged in circuit with the said coil 8 and its leads 9 and 10. A contact-switch 23 may be provided, Fig. 5, which is connected in series with the auxiliary coil 8 and by means of which the said coil 8 is connected to different portions or windings of the volt-coil.

In Fig. 6 is shown a vertically-arranged iron core 24, rigidly fixed upon a plate 25, having its opposite ends longitudinally slotted to admit the respective set-screws 26. The plate 25 is thus adapted for a longitudinal sliding adjustment upon its support. The function of this core 24 is to enable the meter to start on very small loads by imparting an auxiliary or starting torque to the revoluble armature to overcome the incidental friction and inertia.

The action and manner of employing the core 24 are as follows: Assuming that no current is traversing the series coil 5, but that a current is traversing the shunt field-coils 7 and 8, the resultant magnetism of these coils is diverted laterally toward the iron core 24 and passes through the said disk armature, thereby inducing eddy-currents therein. The said armature is then actuated by the reaction of these eddy-currents upon the field producing them with a speed which can be regulated or varied at pleasure by adjusting said core 24 toward or away from the said coils 7 and 8. In the present instance the speed of the armature is adjusted to overcome the friction and inertia only, as before stated. Obviously the said core 24 can readily be adapted for a vertical instead of a horizontal adjustment, if desired, and the amount of iron in said core can be varied to produce the desired results.

In Fig. 8 the field-coils 5 are shown as mounted upon the inwardly-projecting and diametrically opposite polar extensions of the iron punching 27, which constitutes a closed type of field. The coils 7 and 8 in this construction are arranged within the cylindrical armature.

Obviously the relative arrangement of the energizing and phase-changing coils may be indefinitely varied without departing from the spirit and scope of my invention.

Briefly stated, the operation of my invention is as follows: When an impulse of current from the generator traverses the coil 5, a magnetic field is set up in said coil which is in phase with the electromotive force of the circuit 17 and 18 when the work-circuit consists of incandescent lamps or other non-inductive translating devices. To have the torque exerted upon the said armature proportional to the real or actual watts when the current in the series coil 5 lags, as where an inductive load is substituted for the said lamps, the magnetic field set up by the volt-coil must be ninety degrees behind the pressure of the circuit 17 and 18, and also ninety degrees behind the magnetism of the series coil 5 when the load is non-inductive. To produce a lag of the current in the volt-coil, the impedance-coil 16 is inserted in series therewith; but for reasons well understood in the art the impedance-coil cannot retard the phase of the current to exactly ninety degrees, but will be somewhat less than quadrature. To obtain quadrature, I employ the auxiliary coil 8 and shunt it around the volt-coil 7, as described, and by varying the resistance 13, which is in series with the auxiliary coil 8, I combine their respective magnetizing forces into a resultant which is in exact quadrature with the pressure at the terminals of the shunt-leads 11 and 12. This is best understood with reference to Fig. 9, in which the line E represents the impressed electromotive force of the system and also the magnetism of the series field-coil 5 when the load is non-inductive. The line 7 represents the magnetism of the coil 7, which is caused to lag by the impedance-coil 16, connected in series therewith. The line 8 represents the phase and magnetism of the coil 8, which does not lag as much as that of the said coil 7, because its turns are less in number and have a non-inductive resistance 13 in series therewith; but by reversing the turns or convolutions of the said coil 8, so that they oppose the turns of the coil 7, the line 8ª will represent their phase relation to the line 7. Then by completing the parallelogram of forces in the usual manner the resultant magnetism of the said coils 7 and 8 is shown by the line 7ª. By winding the auxiliary coil 8 with resistance-wire and properly proportioning its length of wire and number of turns the said resistance 13 may be dispensed with. The said revoluble armature is actuated by the shifting field established by the series coil 5 and the resultant field of the coils 7 and 8. If the pressure is constant, the speed will be proportional to the current passing through the coil 5, and if the current through the series coil 5 is constant the speed will vary directly as the current through the volt-coil or as the pressure at the terminals of the shunt-wires 11 and 12. If there is no inductance in the work-circuit, the speed of the armature will be proportional to the product of the current values through the coils 5 and 7 or of amperes and volts; but if the load is inductive the speed will be proportional to the product of the pressure and current and the cosine of the phase angle.

Any suitable retarding device in which the retardation varies directly as the speed may be employed to make the speed of the meter proportional to the energy passing through it, such as may be obtained by revolving a metallic disk armature between the poles of a permanent magnet or magnets. Such a magnet or magnets may be adapted to embrace said armature between their poles to obtain the required retardation, if desired.

What I desire to secure by Letters Patent is—

1. In a motor-meter, the combination with a series field-coil, of an armature in inductive relation therewith, a shunt field-coil also in inductive relation with said armature, adapted for inclusion with circuit-mains, an auxiliary shunt-coil reversely included with said mains, and means for deflecting more or less of lines of force of said auxiliary shunt-coil through said armature, substantially as described.

2. In a motor-meter, the combination with a series field-coil, of an armature in inductive relation therewith, a shunt field-coil also in inductive relation with said armature, adapted for inclusion with circuit-mains, an auxiliary shunt-coil conductively included with said mains, the said auxiliary shunt-coil being included with the mains in a reverse direction, and means for moving said auxiliary shunt-coil, thereby to vary the magnetic effect of the lines of force of said auxiliary shunt-coil on the armature, substantially as described.

3. The combination of a series coil; a volt or shunt coil; an auxiliary coil in multiple to said volt-coil; means for varying the axis of magnetization of said auxiliary coil out of parallelism with the axis of magnetization of the said volt-coil; and a revoluble metallic armature adapted to be actuated by the combined influence of the said series and volt and auxiliary coils.

4. In a motor-meter for alternating currents, a series coil or coils; a volt-coil; an impedance-coil in series with said volt-coil; an auxiliary coil in coöperative relation with said volt-coil; means for connecting said auxiliary coil in multiple to more or less of the convolutions of said volt-coil; and a closed revoluble metallic armature in inductive relation to said energizing-coils.

5. The combination with the pressure field-coil of an induction motor-meter, of a revoluble armature in inductive relation therewith, an adjustable iron core 24 to assist in overcoming the friction of the bearings by attracting laterally through the said armature the magnetism representing the electromotive force and produced by the said pressure field-coil, the said iron core having its longitudinal axis parallel with but eccentric to the said pressure field-coil, a second pressure field-coil receiving current independently of the aforesaid pressure field-coil, and means for affording said core a lateral adjustment for the purpose described.

6. In an induction motor-meter, a series field-coil, a volt or pressure coil, an auxiliary coil shunted around the said pressure-coil, the convolutions of said auxiliary coil being wound in a direction opposite to or opposing the convolutions of said pressure-coil, an impedance-coil in series with said pressure-coil, a revoluble metallic armature in inductive relation to said series, pressure and auxiliary coils, and means for moving the said auxiliary coil thereby to vary the magnetic effect of the lines of force of said auxiliary shunt-coil on the armature, substantially as described.

7. In a motor-meter, the combination with a series field-coil, of an armature in inductive relation therewith, a shunt field-coil also in inductive relation with said armature, adapted for inclusion with circuit-mains, an auxiliary shunt-coil reversely included with said mains, means for deflecting more or less of lines of force of said auxiliary shunt-coil through said armature, and an impedance-coil in multiple series arrangement with said shunt-coils, substantially as described.

8. In an induction-meter, the combination with series and shunt coils, of an armature in inductive relation therewith, a core associated with said shunt-coil for deflecting lines of force through said armature to induce eddy-currents therein for the purpose of overcoming friction of said armature, said core having its longitudinal axis parallel with said coil, and mounted on the side of the armature opposite to the side on which the pressure-coil is located, and means for varying the magnetic relation of said core to said coils, substantially as described.

9. In an electric meter, the combination with a current-winding, of a pressure-winding, an auxiliary pressure field-winding cooperatively associated with the said pressure-winding and included in shunt of turns of the said pressure-winding and being included therewith in a series-parallel connection with the source of current, means for effecting a relative displacement between the said pressure-windings, and a revoluble armature subjected to the action of said energizing-windings, substantially as described.

10. In an electric meter, the combination with a current-winding, of a pressure-winding, an auxiliary pressure field-winding cooperatively associated with the said pressure-winding and included in shunt of turns of the said pressure-winding and being included therewith in a series-parallel connection with the source of current, means for effecting a relative displacement between the said pressure-windings, a revoluble armature subjected to the action of said energizing-windings, and a phase-modifier associated with said series-parallel circuit, substantially as described.

11. In an electric meter, the combination with a current-winding, of a pressure-winding, an auxiliary pressure field-winding cooperatively associated with the said pressure-winding and included in shunt of turns of the said pressure-winding and being included therewith in a series-parallel connection with the source of current, means for effecting a relative displacement between the said pressure-windings, a revoluble armature subjected to the action of said energizing-windings, and a phase-modifier in series with said pressure-windings, substantially as described.

12. In an electric meter, the combination with a current-winding, of a pressure-winding, an auxiliary pressure field-winding cooperatively associated with the said pressure-winding and included in shunt of turns of the said pressure-winding and being included therewith in a series-parallel connection with the source of current, means for effecting a relative displacement between the said pressure-windings, a revoluble armature subjected to the action of said energizing-windings, and an impedance-coil in series with said pressure-windings.

13. An alternating-current electric motor provided with a current-winding, a pressure field-coil and an auxiliary coil in multiple with the pressure-coil, and adjustable in position with respect to said pressure-coil, substantially as described.

14. An alternating-current electric motor provided with a current-winding and two relatively adjustable pressure field-coils in parallel with each other and in series parallel with a source of current, substantially as described.

Signed by me at Fort Wayne, Allen county, State of Indiana, this 8th day of April, A. D. 1898.

THOMAS DUNCAN.

Witnesses:
JOHN E. DALTON,
HOMER V. CARPENTER.